US012148252B2

(12) United States Patent
Swearingen et al.

(10) Patent No.: US 12,148,252 B2
(45) Date of Patent: Nov. 19, 2024

(54) REPEATED DIAGNOSTIC REASONER USE THROUGHOUT SERVICE AND MAINTENANCE OF A VEHICLE

(71) Applicant: The Boeing Company, Chicago, IL (US)

(72) Inventors: Kevin Swearingen, Saint Charles, MO (US); Stanley C. Ofsthun, O'Fallon, MO (US); Scott Hathaway, Saint Peters, MO (US); Belma A. Johnson, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 278 days.

(21) Appl. No.: 17/694,015

(22) Filed: Mar. 14, 2022

(65) Prior Publication Data

US 2022/0398871 A1 Dec. 15, 2022

Related U.S. Application Data

(60) Provisional application No. 63/208,768, filed on Jun. 9, 2021.

(51) Int. Cl.
*G07C 5/00* (2006.01)
*B64D 45/00* (2006.01)
(Continued)

(52) U.S. Cl.
CPC ............ *G07C 5/006* (2013.01); *B64F 5/40* (2017.01); *B64F 5/60* (2017.01); *G06Q 10/20* (2013.01);
(Continued)

(58) Field of Classification Search
None
See application file for complete search history.

(56) References Cited

U.S. PATENT DOCUMENTS

2008/0040152 A1  2/2008  Vian et al.
2011/0046842 A1*  2/2011  Smith ............... G07C 5/006
                                                 701/31.4
(Continued)

OTHER PUBLICATIONS

Keller, An Architecture to Implement Integrated Vehicle Health Management Systems, 2001, IEEE (Year: 2001).*

*Primary Examiner* — Christian Chace
*Assistant Examiner* — Shayne M. Gilbertson
(74) *Attorney, Agent, or Firm* — Quinn IP Law

(57) ABSTRACT

A method is provided for use in maintenance of a vehicle. The method includes an onboard computer including an onboard reasoner diagnosing a failure mode onboard the vehicle using an onboard diagnostic model. The onboard reasoner further determines a service recommendation of a service action to address the failure mode. The method also includes an off-board computer including an off-board copy of the onboard reasoner receiving a measure of fix effectivity of the service action as performed to address the failure mode. The off-board copy diagnoses the failure mode or an alternate failure mode, from the measure of fix effectivity of the service action, and using an off-board copy of the onboard diagnostic model. Responsive to diagnosis of the alternate failure mode, the off-board copy determines a maintenance recommendation of a maintenance action to address the alternate failure mode, and generating a maintenance message including the maintenance recommendation.

20 Claims, 11 Drawing Sheets

(51) Int. Cl.
*B64F 5/40* (2017.01)
*B64F 5/60* (2017.01)
*G06Q 10/20* (2023.01)
*G07C 5/08* (2006.01)

(52) U.S. Cl.
CPC .......... *G07C 5/008* (2013.01); *G07C 5/0808* (2013.01); *G07C 5/085* (2013.01); *B64D 2045/0085* (2013.01)

(56) References Cited

U.S. PATENT DOCUMENTS

| | | |
|---|---|---|
| 2011/0087387 A1 | 4/2011 | Safa-Baksh et al. |
| 2014/0067695 A1 | 3/2014 | Black et al. |
| 2015/0185128 A1 | 7/2015 | Chang et al. |
| 2015/0242472 A1 | 8/2015 | Kasik et al. |
| 2015/0375870 A1 | 12/2015 | Poisson, Jr. et al. |
| 2016/0034858 A1 | 2/2016 | Avery et al. |
| 2016/0314627 A1* | 10/2016 | Fish ...................... G07C 5/0808 |
| 2017/0132578 A1* | 5/2017 | Merg ...................... G07C 5/00 |

* cited by examiner

REPEATED DIAGNOSTIC REASONER USE THROUGHOUT SERVICE AND MAINTENANCE OF A VEHICLE

CROSS-REFERENCE TO RELATED APPLICATION(S)

The present application claims the benefit of and priority to U.S. Provisional Patent Application No. 63/208,768, filed Jun. 9, 2021, entitled *Repeated Diagnostic Reasoner Use Throughout Service and Maintenance of a Vehicle*, which is related to U.S. patent application Ser. No. 17/027,890, filed Sep. 22, 2020, entitled *Closed-Loop Diagnostic Model Maturation for Complex Systems*, the content of each of which is incorporated herein by reference in its entirety.

TECHNOLOGICAL FIELD

The present disclosure relates generally to vehicle service and maintenance and, in particular, to onboard diagnosis of a vehicle system failure mode and related vehicle service and maintenance.

BACKGROUND

Vehicles such as aircraft, ground vehicles, watercraft, amphibious vehicles, spacecraft and the like, typically include some type of performance monitoring system that records data regarding the vehicle performance, which includes the performance of the various systems (and sub-systems) of the vehicle. The data include a record of certain performance events that occur during the operation of the vehicle. The performance monitoring system typically conducts data collection and reports all of the data collected to the user. The user then may utilize the data in determining the type of maintenance or repair, if any, that the vehicle may need. For example, if the data indicates that a particular mechanical or electromechanical system of the vehicle is malfunctioning or that the performance of one or more mechanical or electromechanical systems may contribute to a future vehicle failure, then the user can perform the appropriate repair on the vehicle at the next opportunity.

While the current systems for vehicle performance and fault monitoring provide the necessary data for a user to make an appropriate repair decision, it is still necessary for a user to sort through all of the data to determine the most-appropriate repair action to address a fault mode. Thus, the user must sort and interpret the data in light of the user's knowledge of the particular vehicle. This can be time consuming and not always result in the first performed repair action being the most appropriate repair action, particularly for complex vehicles like aircraft and other vehicles. For many types of vehicle, particularly commercial vehicles, the amount of time the vehicle is out of service is costly to the vehicle owner. As such, the longer it takes for the most-appropriate repair action to be performed for a given fault mode, the longer the vehicle will be out of service, which may be expensive to the vehicle owner if the vehicle would otherwise be in service.

It would therefore be desirable to have a system and method that takes into account at least some of the issues discussed above, as well as other possible issues.

BRIEF SUMMARY

Example implementations of the present disclosure are directed to vehicle service and maintenance and, in particular, to onboard diagnosis of a vehicle system failure mode and related vehicle service and maintenance. Example implementations incorporate a unique combination of similar diagnostic reasoners operating on an identical fault model to ensure the most accurate diagnosis and closed loop error correction for vehicles. When the same fault model and diagnostic reasoner is used in multiple instances in the vehicle support process ecosystem, higher fidelity maintenance recommendations may be achieved, and corrections of any gaps may be automated and implemented much more quickly than the current state of the art, improving vehicle maintenance efficiency and accuracy.

The present disclosure thus includes, without limitation, the following example implementations.

Some example implementations provide a system for use in maintenance of a vehicle that includes vehicle systems configured to report faults to an onboard reasoner, the system comprising an onboard computer including the onboard reasoner that is configured to receive a fault report indicating failed tests reported by a vehicle system, diagnose a failure mode onboard the vehicle, from the failed tests, and using an onboard diagnostic model that represents or describes known relationships between possible failed tests reported by the vehicle systems, and possible failure modes onboard the vehicle systems, the onboard reasoner further configured to determine a service recommendation of a service action to address the failure mode; and an off-board computer including an off-board copy of the onboard reasoner configured to receive the fault report indicating the failed tests, and further address the fault report based on a measure of fix effectivity of the service action, including the off-board copy of the onboard reasoner configured to at least: receive the measure of fix effectivity of the service action as performed to address the failure mode; diagnose the failure mode or an alternate failure mode onboard the vehicle, from the failed tests and the measure of fix effectivity of the service action, and using an off-board copy of the onboard diagnostic model; and responsive to diagnosis of the alternate failure mode, determine a maintenance recommendation of a maintenance action to address the alternate failure mode; and generate a maintenance message including the maintenance recommendation.

Some example implementations provide a method for use in maintenance of a vehicle that includes vehicle systems configured to report faults to an onboard reasoner, the method comprising an onboard computer including the onboard reasoner receiving a fault report indicating failed tests reported by a vehicle system, diagnosing a failure mode onboard the vehicle, from the failed tests, and using an onboard diagnostic model that represents or describes known relationships between possible failed tests reported by the vehicle systems, and possible failure modes onboard the vehicle systems, the onboard reasoner further determining a service recommendation of a service action to address the failure mode; and an off-board computer including an off-board copy of the onboard reasoner receiving the fault report indicating the failed tests, and further addressing the fault report based on a measure of fix effectivity of the service action, including the off-board copy of the onboard reasoner at least: receiving the measure of fix effectivity of the service action as performed to address the failure mode; diagnosing the failure mode or an alternate failure mode onboard the vehicle, from the failed tests and the measure of fix effectivity of the service action, and using an off-board copy of the onboard diagnostic model; and responsive to diagnosis of the alternate failure mode, determining a maintenance recommendation of a maintenance action to address the alternate failure mode; and generating a maintenance message including the maintenance recommendation.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Figure 1:
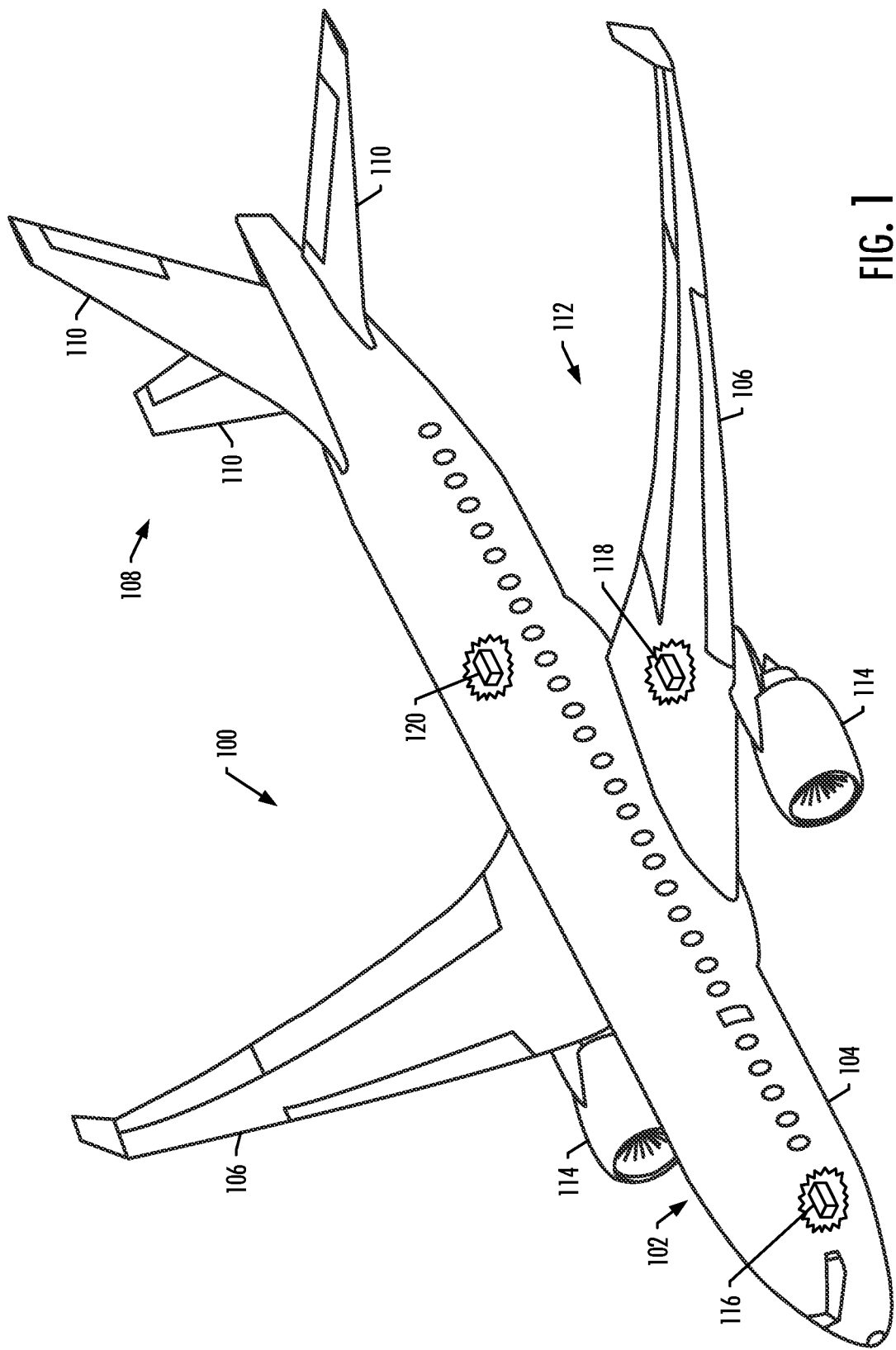
FIG. 1 illustrates one type of vehicle, namely, an aircraft that may benefit from example implementations of the present disclosure.

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Like reference numerals refer to like elements throughout.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure relate generally to vehicular engineering and, in particular, to one or more of the design, construction, operation or use of vehicles. As used herein, a vehicle is a machine designed as an instrument of conveyance by land, water or air. A vehicle designed and configurable to fly may at times be referred to as an aerial vehicle, an aircraft or the like. Other examples of suitable vehicles include any of a number of different types of ground vehicles (e.g., motor vehicles, railed vehicles), watercraft, amphibious vehicles, spacecraft and the like.

A vehicle generally includes a basic structure, and a propulsion system coupled to the basic structure. The basic structure is the main supporting structure of the vehicle to which other components are attached. The basic structure is the load-bearing framework of the vehicle that structurally supports the vehicle in its construction and function. In various contexts, the basic structure may be referred to as a chassis, an airframe or the like.

The propulsion system includes one or more engines or motors configured to power one or more propulsors to generate propulsive forces that cause the vehicle to move. A propulsor is any of a number of different means of converting power into a propulsive force. Examples of suitable propulsors include rotors, propellers, wheels and the like. In some examples, the propulsion system includes a drivetrain configured to deliver power from the engines/motors to the propulsors. The engines/motors and drivetrain may in some contexts be referred to as the powertrain of the vehicle.

FIG. 1 illustrates one type of vehicle, namely, an aircraft 100 that may benefit from example implementations of the present disclosure. As shown, the aircraft includes a basic structure with an airframe 102 including a fuselage 104. The airframe also includes wings 106 that extend from opposing sides of the fuselage, an empennage or tail assembly 108 at a rear end of the fuselage, and the tail assembly includes stabilizers 110. The aircraft also includes a plurality of high-level systems 112 such as a propulsion system. In the particular example shown in FIG. 1, the propulsion system includes two wing-mounted engines 114 configured to power propulsors to generate propulsive forces that cause the aircraft to move. In other implementations, the propulsion system can include other arrangements, for example, engines carried by other portions of the aircraft including the fuselage and/or the tail. As also shown, the high-level systems may also include an electrical system 116, hydraulic system 118 and/or environmental system 120. Any number of other systems may be included.

Figure 2:
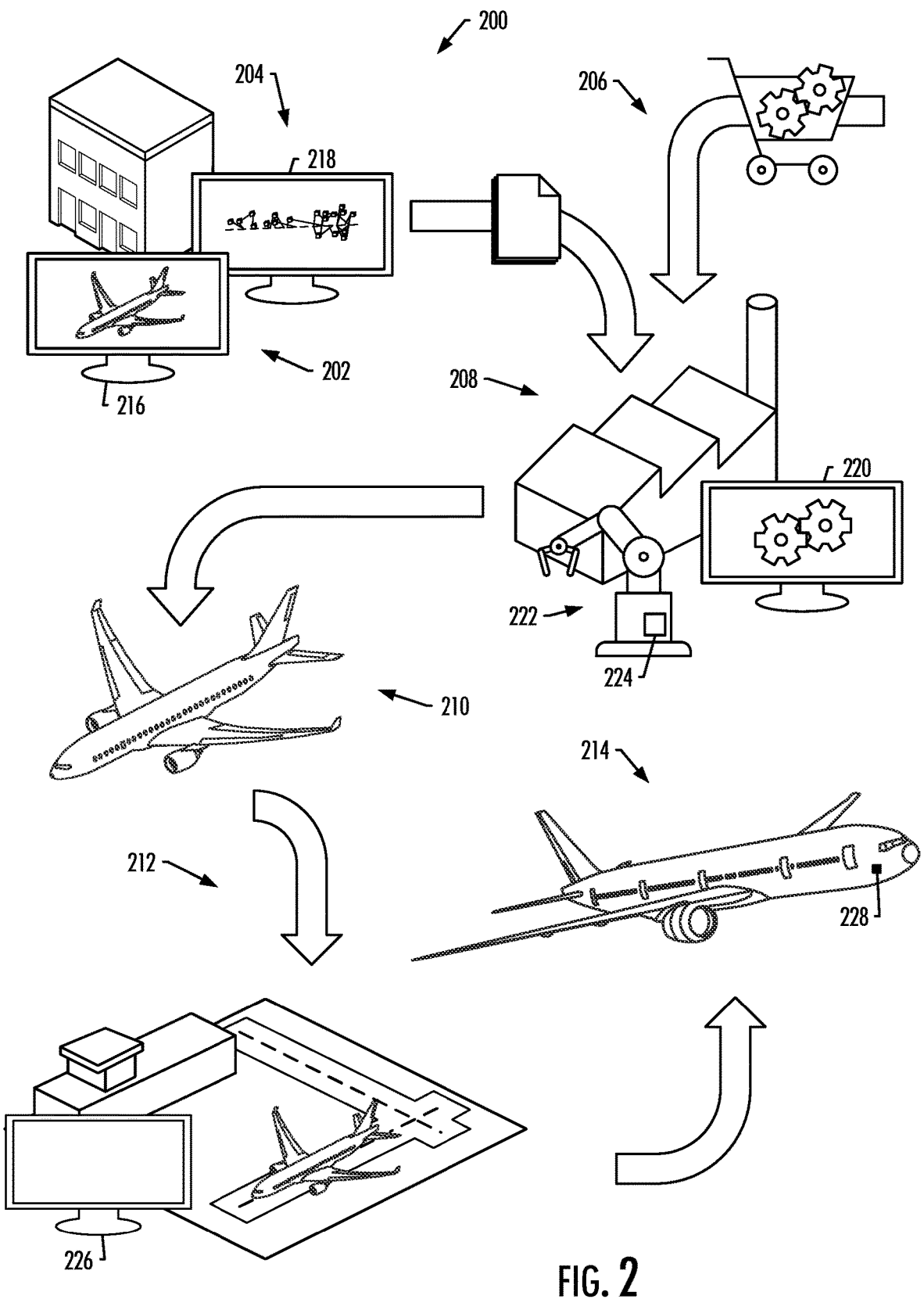
FIG. 2 illustrates an aircraft manufacturing and service method, according to some example implementations.

As explained above, example implementations of the present disclosure relate generally to vehicular engineering and, in particular, to one or more of the design, construction, operation or use of vehicles such as aircraft 100. Thus, referring now to FIG. 2, example implementations may be used in the context of an aircraft manufacturing and service method 200. During pre-production, the example method may include specification and design 202 of the aircraft, manufacturing sequence and processing planning 204 and material procurement 206. During production, component and subassembly manufacturing 208 and system integration 210 of the aircraft takes place. Thereafter, the aircraft may go through certification and delivery 212 in order to be placed in service 214. While in service by an operator, the aircraft may be scheduled for service and maintenance (which may also include modification, reconfiguration, refurbishment or the like).

Each of the processes of the example method 200 may be performed or carried out by a system integrator, third party and/or operator (e.g., customer). For the purposes of this description, a system integrator may include for example any number of aircraft manufacturers and major-system subcontractors; a third party may include for example any number of vendors, subcontractors and suppliers; and an operator may include for example an airline, leasing company, military entity, service organization or the like.

As will also be appreciated, computers are often used throughout the method 200; and in this regard, a "computer" is generally a machine that is programmable to programmed to perform functions or operations. The method as shown makes use of a number of example computers. These computers include computers 216, 218 used for the specification and design 202 of the aircraft, and the manufacturing sequence and processing planning 204. The method may also make use of computers 220 during component and subassembly manufacturing 208, which may also make use of computer numerical control (CNC) machines 222 or other robotics that are controlled by computers 224. Even further, computers 226 may be used while the aircraft is in service 214, as well as during maintenance and service; and as suggested in FIG. 1, the aircraft may itself include one or more computers 228 as part of or separate from its electrical system 116.

A number of the computers 216-228 used in the method 200 may be co-located or directly coupled to one another, or in some examples, various ones of the computers may communicate with one another across one or more computer networks. Further, although shown as part of the method, it should be understood that any one or more of the computers may function or operate separate from the method, without regard to any of the other computers. It should also be understood that the method may include one or more additional or alternative computers than those shown in FIG. 2.

Example implementations of the present disclosure may be implemented throughout the aircraft manufacturing and service method 200, but are particularly well suited for implementation during in service 214, as well as during maintenance and service.

Figure 3:
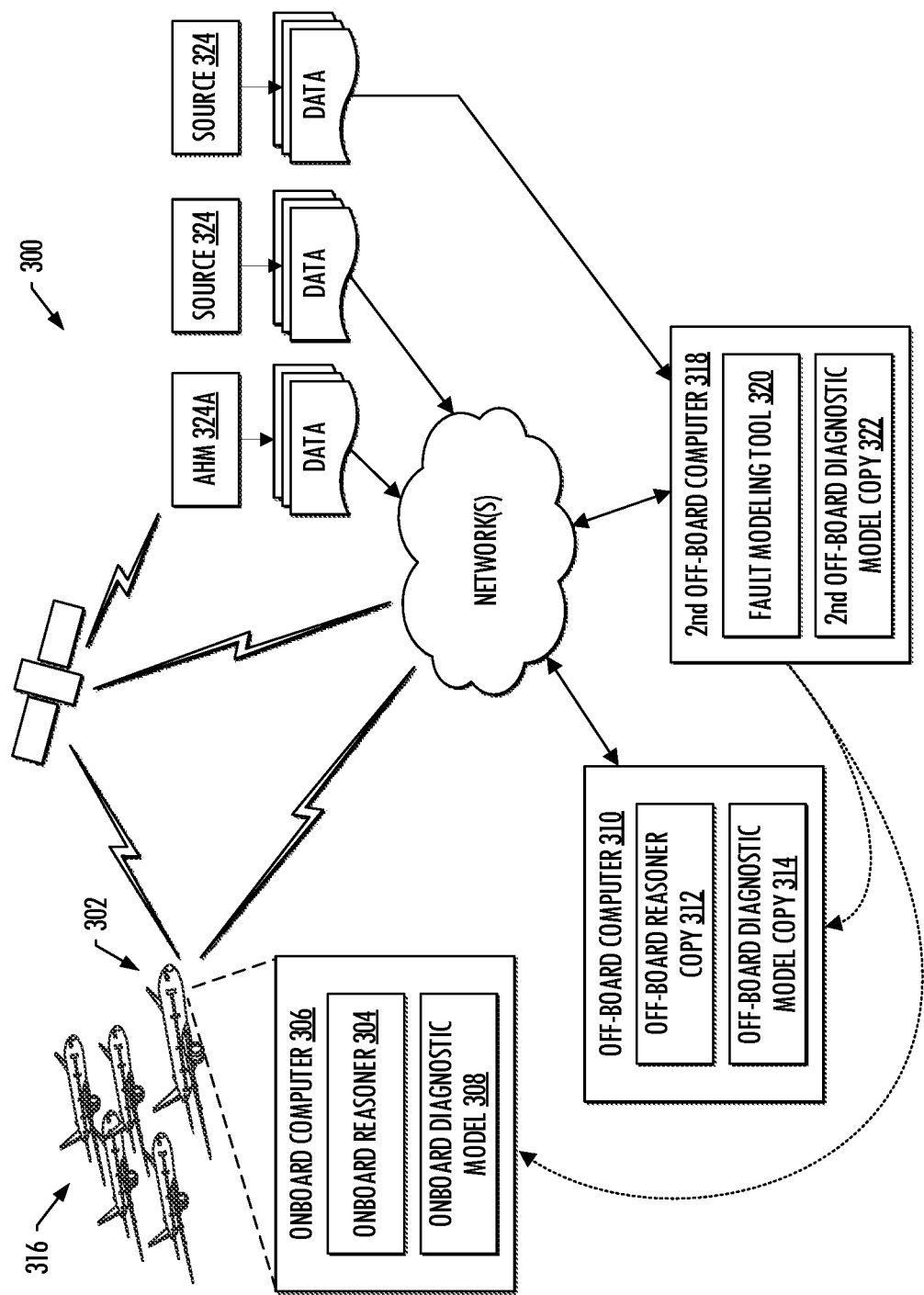
FIG. 3 illustrates a system for use in maintenance of a vehicle that includes vehicle systems configured to report faults to an onboard reasoner, according to some example implementations.

FIG. 3 illustrates a system 300 for use in maintenance of a vehicle 302 such as an aircraft 100 that includes vehicle systems configured to report faults to an onboard reasoner 304, according to some example implementations. This onboard reasoner in some example implementations is a real-time or near-real-time reasoner. As described in greater detail below, the system may include any of a number of different subsystems (each an individual system) for performing one or more functions or operations. The subsystems may be co-located or directly coupled to one another, or in some examples, various ones of the subsystems may communicate with one another across one or more artificial satellites, computer networks and the like. Further, although shown as part of the system, it should be understood that any one or more of the subsystems may function or operate as a separate system without regard to any of the other subsystems. It should also be understood that the system may include one or more additional or alternative subsystems than those shown in FIG. 3.

As explained above, a vehicle 302 such as an aircraft 100 includes a plurality of high-level systems 112. These high-level systems may include a plurality of sensors and subsystems providing fault and sensor data that is communicated via an aircraft data communications bus network and/or an onboard network system (ONS) to an aircraft condition monitoring system (ACMS). The ACMS may collect, monitor, record and report real-time aircraft system data, which may include error messages from a flight deck effects (FDE) system, system test reports, fault reports and other information. The data collected by the ACMS is used, for example, to perform cabin pressure and temperature monitoring, hard landing detection, flight crew monitoring, and engine monitoring in addition to many other aircraft performance functions. The received data is then utilized to analyze aircraft performance, record significant flight events, report aircraft system test reports and fault reports, and troubleshoot faults.

The ACMS may be in communication with an onboard component/computer 306 that in some examples corresponds to computer 228. In various examples, the onboard computer may also be referred to as a central maintenance computer (CMC), on which may reside an aircraft health management or maintenance management system and a diagnostic maintenance computing function (DMCF). The onboard computer including the DMCF may receive aircraft system test reports and fault reports, and may further include an onboard diagnostic model. The DMCF may provide data acquisition for the onboard diagnostic model, which receives the test reports and fault report data.

In some example implementations, the onboard computer 306 includes the onboard reasoner 304. The onboard reasoner is configured to receive a fault report indicating failed tests reported by a vehicle system. The onboard reasoner is configured to diagnose a failure mode onboard the vehicle, from the failed tests, and using an onboard diagnostic model 306 that represents or describes known relationships between possible failed tests reported by the vehicle systems, and possible failure modes onboard the vehicle systems. And the onboard reasoner is further configured to determine a service recommendation of a service action to address the failure mode.

As also shown in FIG. 3, the system 300 includes an off-board computer 310 that in some examples corresponds to computer 226. The off-board computer includes an offboard copy 312 of the onboard reasoner 304 configured to receive the fault report indicating the failed tests, and further address the fault report based on a measure of fix effectivity of the service action. This includes the off-board copy of the onboard reasoner configured to receive the measure of fix effectivity of the service action as performed to address the failure mode. The off-board copy of the onboard reasoner is configured to diagnose the failure mode or an alternate failure mode onboard the vehicle 300, from the failed tests and the measure of fix effectivity of the service action, and using an off-board copy 314 of the onboard diagnostic model. In some further examples, the off-board computer is further configured to record performance of the service action on the vehicle 302, and determine the measure of fix effectivity of the service action as performed to address the failure mode.

Responsive to diagnosis of the alternate failure mode, the off-board copy 310 of the onboard reasoner 302 is configured to determine a maintenance recommendation of a maintenance action to address the alternate failure mode, and generate a maintenance message including the maintenance recommendation.

In some further examples, the off-board copy 312 of the onboard reasoner 304 is configured to receive fault reports across a fleet of vehicles 316 of an operator. The fleet of vehicles (including the vehicle 302) have respective onboard computers 306 including the onboard reasoner 304 that uses the onboard diagnostic model 308. In these examples, the off-board copy of the onboard reasoner is configured to further address the fault reports based on measures of fix effectivity of respective service actions as performed across the fleet of vehicles.

In some examples, the method 300 further includes a second off-board computer 318 that in some examples corresponds to computer 216. The second off-board computer includes a fault modeling tool 320 configured to receive the fault report indicating the failed tests. The fault modeling tool is configured to further address the fault report based on at least one of the measure of fix effectivity of the service action, or a measure of fix effectivity of the maintenance action. This includes the fault modeling tool configured to receive one or more measures of fix effectivity including the at least one of the measure of fix effectivity of the service action, or the measure of fix effectivity of the maintenance action as performed to address the alternate failure mode. In some further examples, the second off-board computer is further configured to at least record performance of the maintenance action on the vehicle 302, and determine the measure of fix effectivity of the maintenance action as performed to address the alternate failure mode.

The fault modeling tool 320 is configured to update a second off-board copy 322 of the onboard diagnostic model 308 based on the fault report, and the one or more measures of fix effectivity. And the fault modeling tool is configured to update the onboard diagnostic model used by the onboard reasoner 304 on the onboard computer 306 to incorporate the update to the second off-board copy of the onboard diagnostic model.

In some examples, the fault modeling tool 320 is configured to receive fault reports across the fleet of vehicles 316 of the operator. As before, the fleet of vehicles have respective onboard computers 306 including the onboard reasoner 304 that uses the onboard diagnostic model 308. In some of these examples, the fault modeling tool is configured to further address the fault reports based on at least one of measures of fix effectivity of respective service actions, or measures of fix effectivity of respective maintenance actions, as performed across the fleet of vehicles. And in even some further examples, the fault modeling tool is configured to receive and further address fault reports across a plurality of fleets of vehicles 316 of a plurality of operators, such as in a similar manner.

As shown, in some examples, either or both the off-board computer 310 and the second off-board computer 318 may also have access to at least one source 324 of data useful in performing the respective operations of one or more of the computers, the off-board copy 312 of the onboard reasoner 304, or the fault modeling tool 320. The source may include a memory located at a single source or distributed across multiple sources. The data may be stored in a number of different manners, such as in a database or flat files of any of a number of different types or formats. In some of these examples in which the vehicle 320 is an aircraft, an aircraft condition monitoring system (ACMS) onboard the aircraft may collect, monitor, record, and report diagnostic data. At least some of the diagnostic data may be accessible from reports generated by the ACMS and may be wirelessly transmitted to a particular source of data—shown and at times referred to as an airplane health management (AHM) system 324A. In other of these examples, the diagnostic data may be transmitted via a wired connection or portable data storage device (e.g., flash memory, thumb drive).

Figure 4:
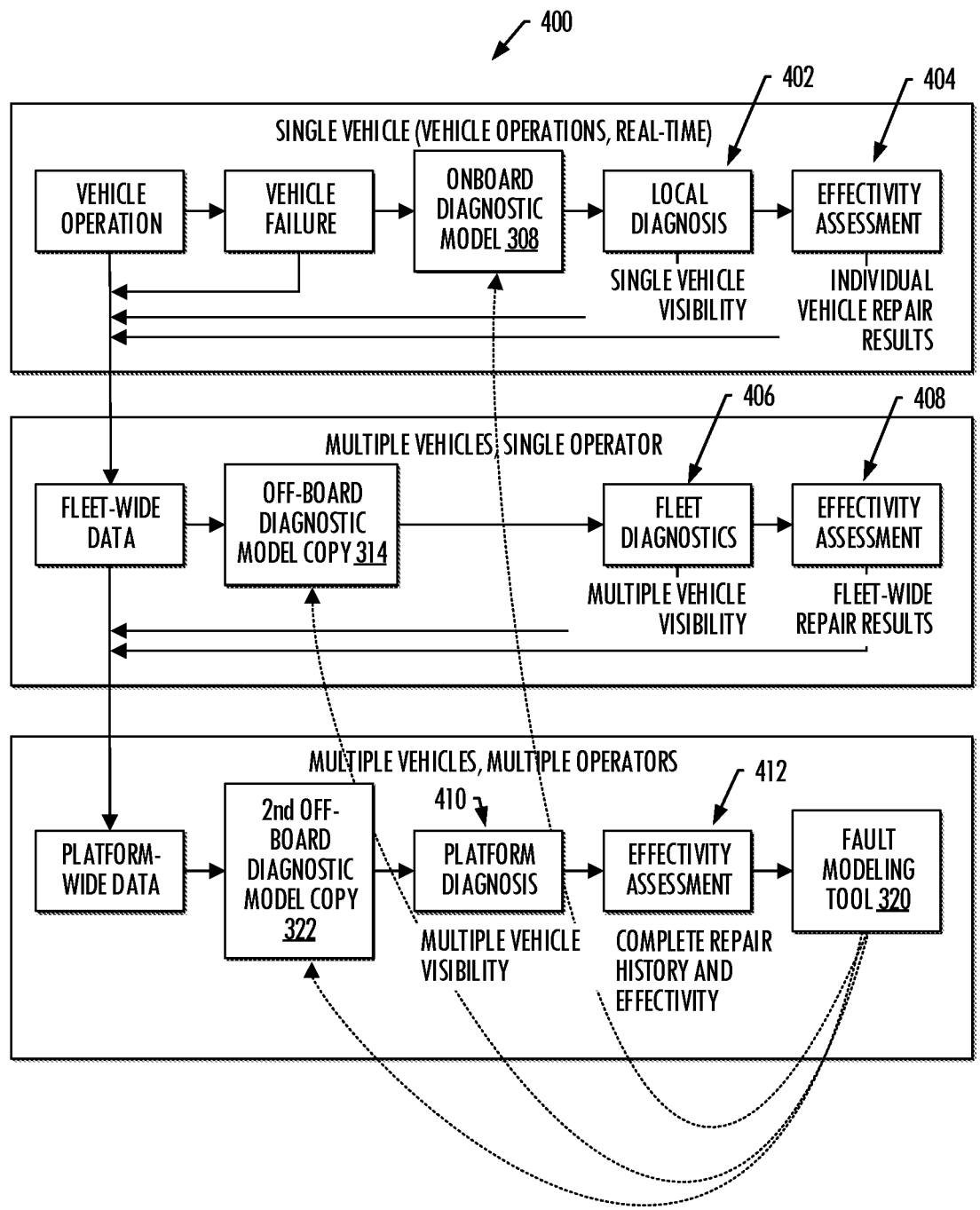
FIG. 4 illustrates a data flow between computers of the system, according to some example implementations.

FIG. 4 illustrates a data flow 400 between computers of the system, according to some example implementations of the present disclosure. As shown at 402, the onboard reasoner 304 may diagnose a failure mode onboard the vehicle from a fault report indicating failed tests, which may include parametric and built-in-test (BIT) data generated by the vehicle 302. The fix effectivity may be determined at 404 by the off-board computer 310, or in some examples by the onboard computer 306, such as by re-running on-vehicle BIT and functional vehicle testing.

As shown at 406, the off-board copy 312 of the onboard reasoner 304 at the off-board computer 310 may diagnose the failure mode or an alternate failure mode based on similar data as the onboard reasoner, across a fleet of vehicles 316. This may include current and past vehicle parametric and BIT data from the vehicle, as well as similar parametric and BIT data from similar vehicles in the fleet. Vehicle maintenance history and fix effectivity may also be factored in by the off-board copy of the onboard reasoner. The fix effectivity here may be determined at 408, by the off-board computer or in some examples the second off-board computer 318, from evaluation of maintenance actions performed across the fleet of vehicles. Effective maintenance may be indicated by one to one correspondence between a single maintenance action and a single failure mode. If additional troubleshooting tasks, additional replaced parts, additional or secondary maintenance actions are needed, fix effectivity may be reduced.

On the second off-board computer 318, yet another diagnosis of the failure mode or an alternate failure mode may be made based on historical parametric and BIT data generated by vehicles over one or more fleets of vehicles, as shown at 410. Similar lab and simulation data, with related maintenance history and fix effectivity, from a plurality of operators may also be factored in by the second off-board computer. The second off-board computer may determine fix effectivity from evaluation of all related maintenance performed on vehicles across the one or more fleets of vehicles.

Figure 5:
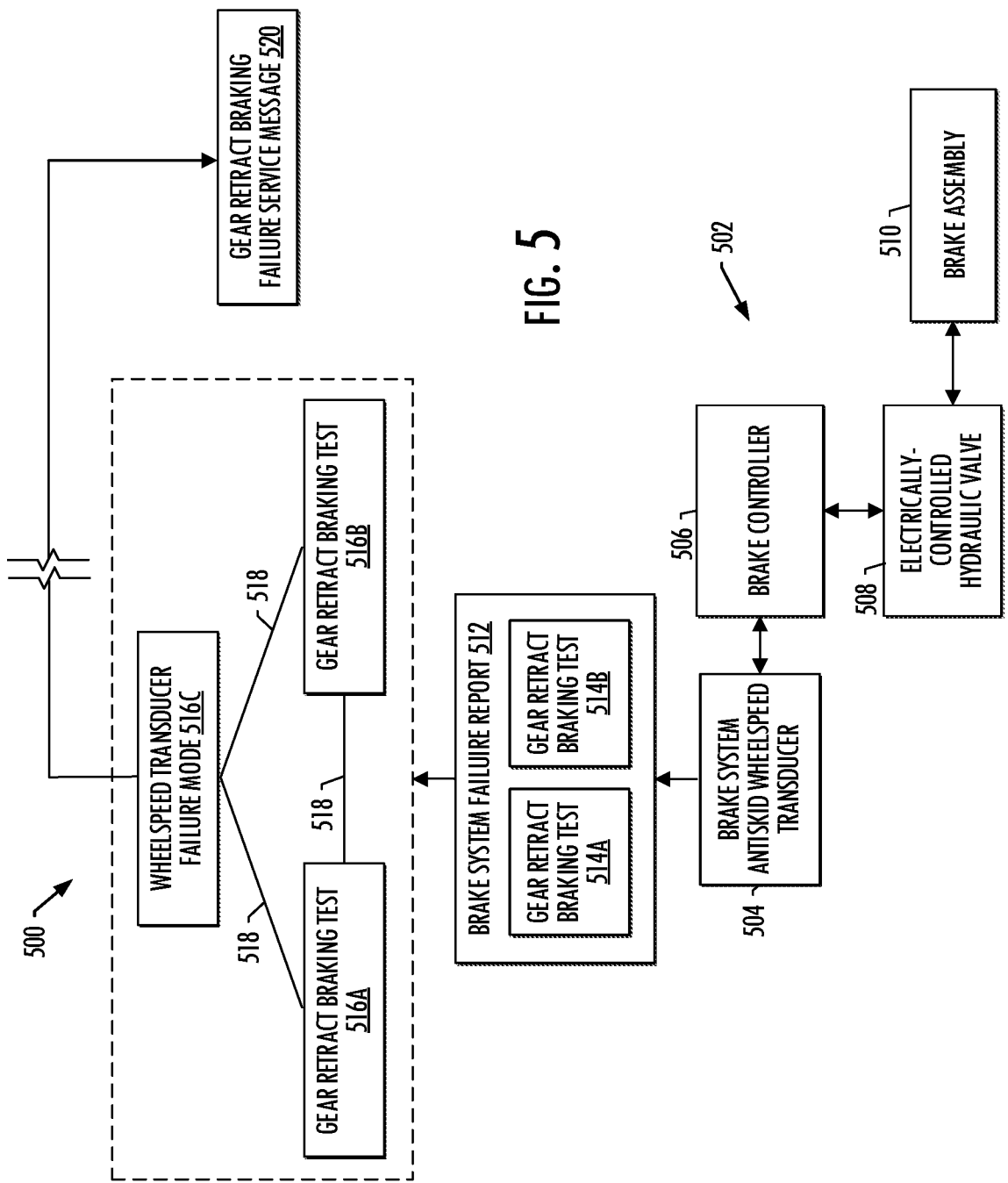
FIG. 5 illustrates an example representation of an onboard diagnostic model, according to some example implementations.

FIG. 5 shows an example representation of an onboard diagnostic model 500 suitable as the onboard diagnostic model 308, according to some example implementations. As shown, the vehicle 302 includes a brake system 502 with a sensor such as an antiskid wheel-speed transducer 504, a brake controller 506, and an electrically-controlled hydraulic valve 508 for controlling hydraulic pressure to a brake assembly 510.

As also shown, a fault report 512 from the antiskid wheel-speed transducer 504 may indicate failed gear retract braking tests 514A, 514B. The onboard diagnostic model 500 may include nodes 516A-C connected by edges 518. The nodes may include nodes 516A, 516B that represent the failed gear retract braking tests, and a node 516C that represents a failure mode with a known causal relationship to the failed tests, as indicated by the edges connecting the nodes. In this regard, the failed tests share a common failure mode of a spurious operation of the antiskid wheel-speed transducer. This failure mode, then, may be diagnosed from the failed tests and using the onboard diagnostic model 500. A service action may be implemented for the failure mode, and a service message 520 that references instructions for performing the service action may be generated.

The off-board computer 310 may record performance of the service action, and determine the measure of fix effectivity of the service action as performed to address the failure mode. The off-board computer may receive similar fault reports for the failure mode and the same or other service actions (e.g., servicing the brake controller 506, the electrically-controlled hydraulic valve 508, etc.) as performed across a fleet of aircraft. Similar measures of fix effectiveness may be determined for these service actions. The off-board computer may diagnose an alternate failure mode, and determine a maintenance recommendation of a maintenance action to address the alternate failure mode across the fleet. In this regard, the maintenance action may include, for example, servicing the brake controller in addition to repair of the antiskid wheel-speed transducer 504.

FIGS. 6A-6G are flowcharts illustrating various steps in a method 600 for use in maintenance of a vehicle 302 that includes vehicle systems 112 configured to report faults to an onboard reasoner 304, according to various example implementations of the present disclosure. The method includes an onboard computer 306 including the onboard reasoner receiving a fault report indicating failed tests reported by a vehicle system, as shown at block 602 of FIG. 6A. The method includes the onboard computer diagnosing 604 a failure mode onboard the vehicle, from the failed tests, and using an onboard diagnostic model 308 that represents or describes known relationships between possible failed tests reported by the vehicle systems, and possible failure modes onboard the vehicle systems, as shown at block 604. And the method includes the onboard reasoner further determining a service recommendation of a service action to address the failure mode, as shown at block 606.

The method 600 also includes an off-board computer 310 including an off-board copy 312 of the onboard reasoner receiving the fault report indicating the failed tests, and further addressing the fault report based on a measure of fix effectivity of the service action, as shown at blocks 608 and 610. This includes the off-board copy of the onboard reasoner receiving the measure of fix effectivity of the service action as performed to address the failure mode, as shown at block 612. The offboard reasoner diagnoses the failure mode or an alternate failure mode onboard the vehicle, from the failed tests and the measure of fix effectivity of the service action, and using an off-board copy 314 of the onboard diagnostic model; and responsive to diagnosis of the alternate failure mode, as shown at block 614. The offboard reasoner determines a maintenance recommendation of a maintenance action to address the alternate failure mode, and generates a maintenance message including the maintenance recommendation, as shown at blocks 616 and 618.

Figure 6A:
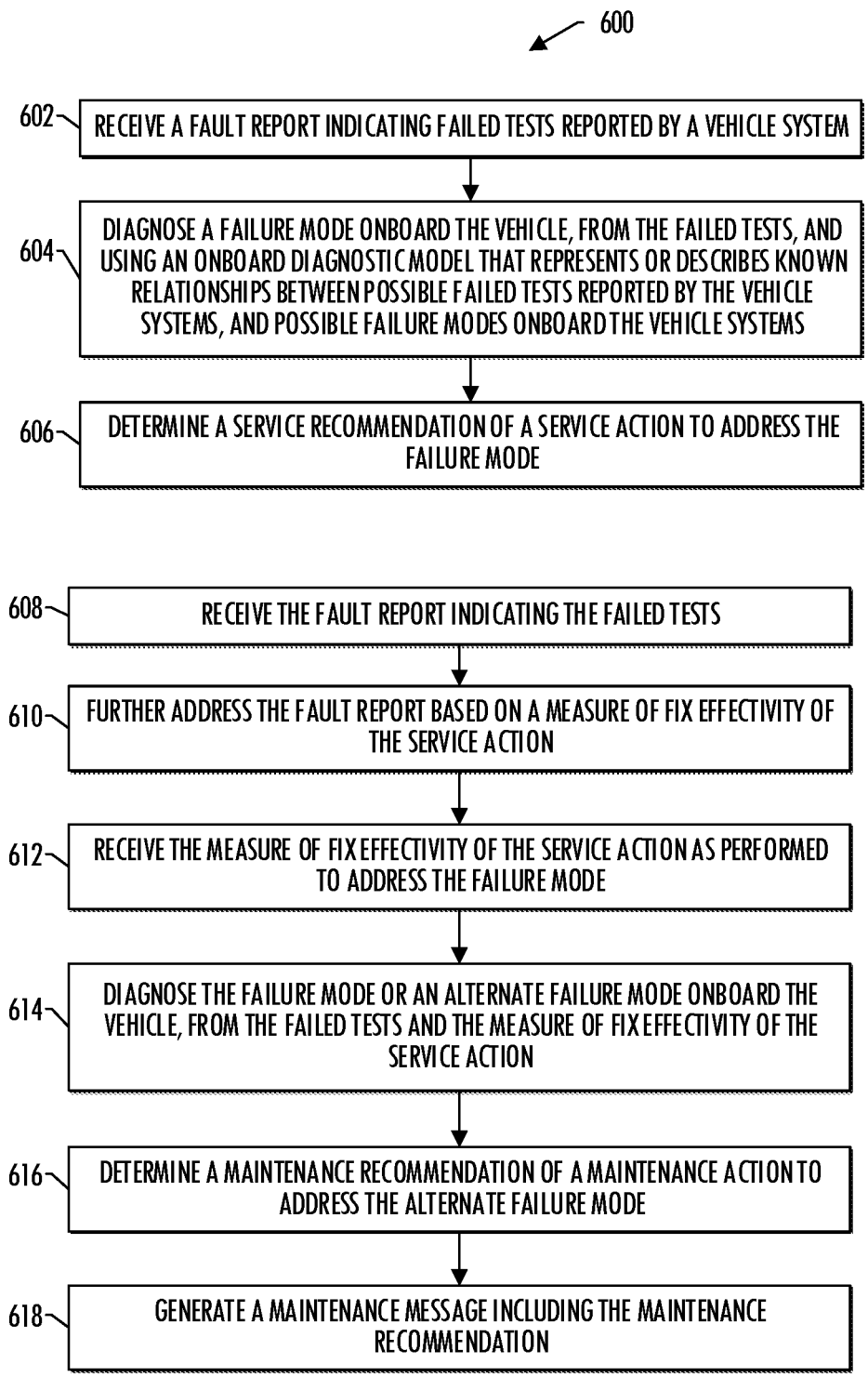
FIGS. 6A, 6B, 6C, 6D, 6E, 6F and 6G are flowcharts illustrating various steps in a method for use in maintenance of a vehicle that includes vehicle systems configured to report faults to an onboard reasoner, according to example implementations.
Figure 6B:
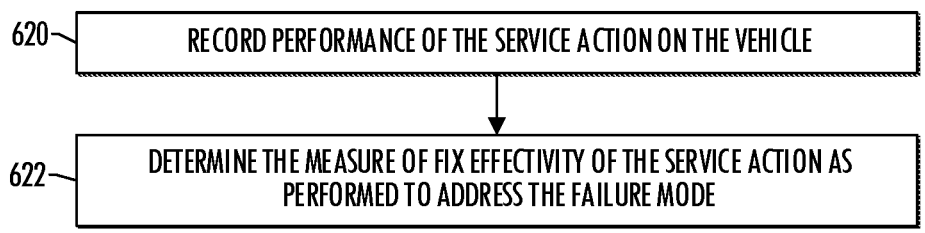

In some examples, the method 600 includes the off-board computer 310 further recording performance of the service action on the vehicle 302, and determining the measure of fix effectivity of the service action as performed to address the failure mode, as shown at blocks 620 and 622 of FIG. 6B.

Figure 6C:
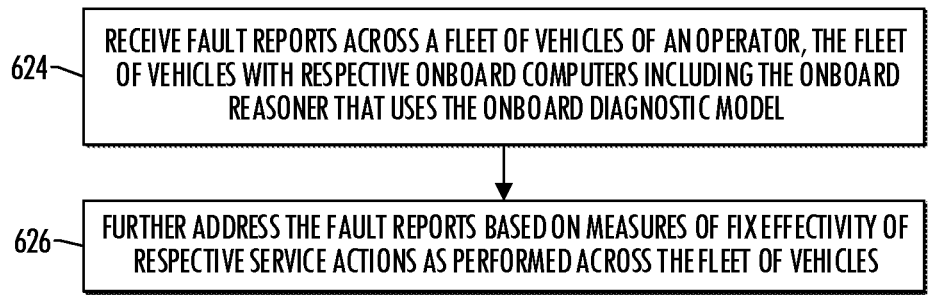

In some examples, the off-board copy 312 of the onboard reasoner 304 receives fault reports across a fleet of vehicles 316 of an operator, as shown at block 624 of FIG. 6C. In some of these examples, the fleet of vehicles have respective onboard computers 306 including the onboard reasoner that uses the onboard diagnostic model 308. The off-board copy of the onboard reasoner, then, further addresses the fault reports based on measures of fix effectivity of respective service actions as performed across the fleet of vehicles, as shown at block 626.

Figure 6D:
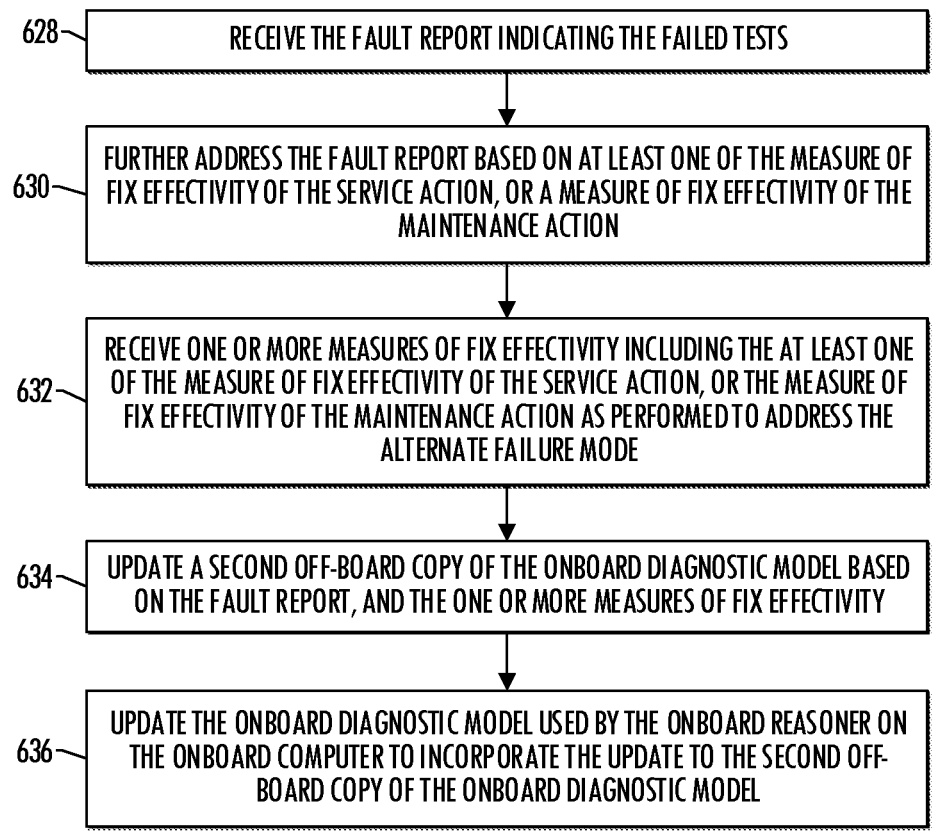

In some examples, the method 600 further includes a second off-board computer 318 including a fault modeling tool 320 receiving the fault report indicating the failed tests, as shown at block 628 of FIG. 6D. In some of these examples, the fault modeling tool further addresses the fault report based on at least one of the measure of fix effectivity of the service action, or a measure of fix effectivity of the maintenance action, as shown at block 630. This includes the fault modeling tool receiving one or more measures of fix effectivity including the at least one of the measure of fix effectivity of the service action, or the measure of fix effectivity of the maintenance action as performed to address the alternate failure mode, as shown at block 632. The fault modeling tool updates a second off-board copy 322 of the onboard diagnostic model 308 based on the fault report, and the one or more measures of fix effectivity, as shown at block 634. And the fault modeling tool updates the onboard diagnostic model used by the onboard reasoner on the onboard computer to incorporate the update to the second off-board copy of the onboard diagnostic model, as shown at block 636.

Figure 6E:
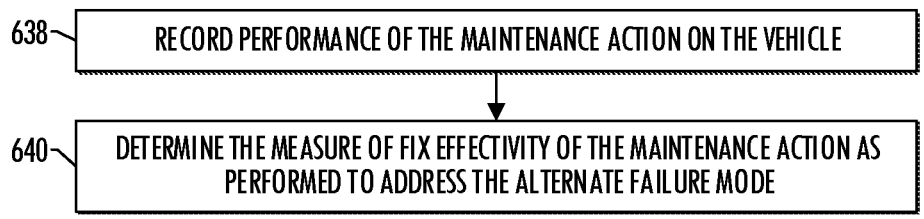

In some examples, the method 600 further includes the second off-board computer 318 further recording performance of the maintenance action on the vehicle 302, and determining the measure of fix effectivity of the maintenance action as performed to address the alternate failure mode, as shown at blocks 638 and 640 of FIG. 6E.

Figure 6F:
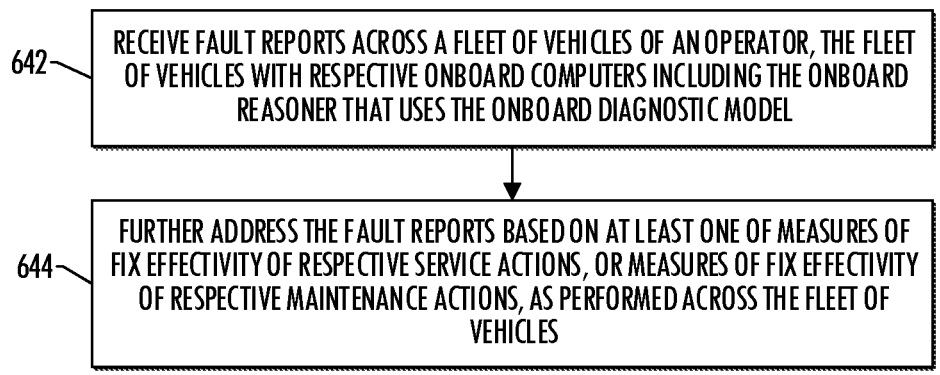

In some examples, the fault modeling tool 320 receives fault reports across a fleet of vehicles 316 of an operator, the fleet of vehicles with respective onboard computers 306 including the onboard reasoner 304 that uses the onboard diagnostic model 308, as shown at block 642 of FIG. 6F. In some of these examples, the fault modeling tool further addresses the fault reports based on at least one of measures of fix effectivity of respective service actions, or measures of fix effectivity of respective maintenance actions, as performed across the fleet of vehicles, as shown at block 644.

Figure 6G:
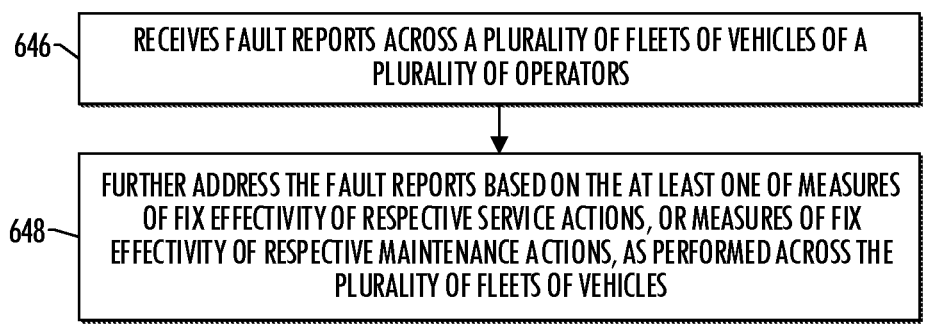

In some examples, the fault modeling tool 320 receives fault reports across a plurality of fleets of vehicles 316 of a plurality of operators, as shown at block 646 of FIG. 6G. In some of these examples, the fault modeling tool further addresses the fault reports based on the at least one of measures of fix effectivity of respective service actions, or measures of fix effectivity of respective maintenance actions, as performed across the plurality of fleets of vehicles, as shown at block 648.

Example implementations of the present disclosure may be implemented by various means. These means may include computer hardware, alone or under direction of one or more computer programs from a computer-readable storage medium. In some examples, one or more apparatuses such as one or more of the computers 216-228, 306, 310, 318 may be configured to implement example implementations of the present disclosure. In examples involving more than one apparatus, the respective apparatuses may be connected to or otherwise in communication with one another in a number of different manners, such as directly or indirectly via a wired or wireless network or the like.

Figure 7:
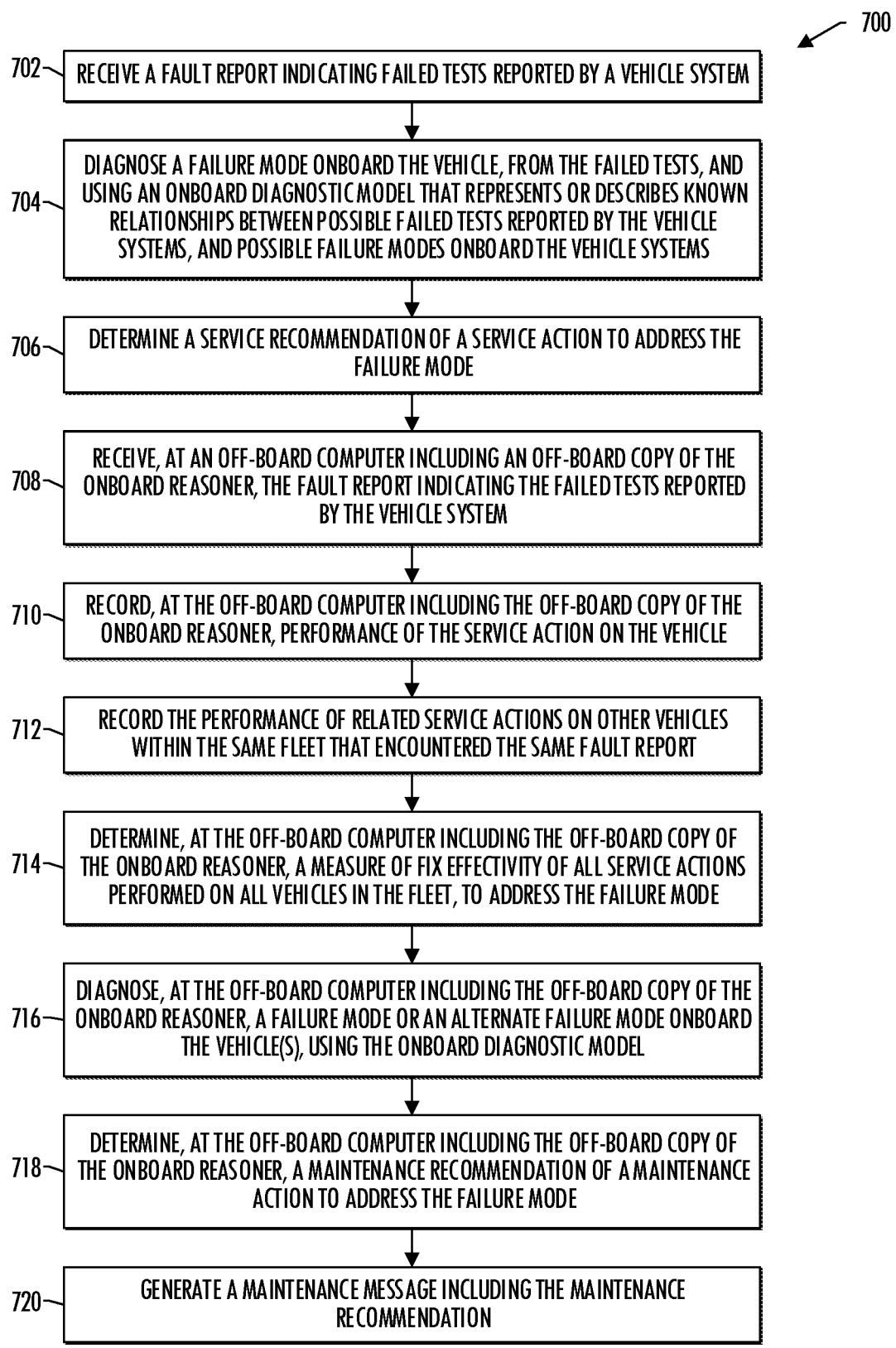
FIG. 7 is a flowchart illustrating various steps in a method for use in maintenance of a vehicle that includes vehicle systems configured to report faults to an onboard reasoner, according to other example implementations.

In some examples, in which the system 302 includes the vehicle 302 with an onboard diagnostic reasoner 304, the onboard diagnostic reasoner 304 may receive a fault report indicating failed tests reported by a vehicle system, such as that associated with an antiskid wheel-speed transducer 504 for example, and diagnose a failure mode using an onboard diagnostic model, to determine a service recommendation of a service action to address the failure mode (such as a service action of an antiskid wheel-speed transducer repair), as in steps 702, 704 and 706 in FIG. 7.

The system 302, which further includes an off-board computer including an off-board copy 312 of the onboard reasoner 304, is configured to receive the fault report indicating the failed tests from the specific vehicle 302 and record the performance of the service action on the vehicle 302, (such as a service action of an antiskid wheel-speed transducer repair, and is further configured to record performance of related service actions on other vehicles that encountered the same fault report (including historical service actions), where such related service actions on other vehicles included performance of additional services (such as servicing the brake controller 506, the electrically-controlled hydraulic valve 508, etc.), as shown at blocks 708, 710 and 712.

The off-board computer including the off-board copy 312 of the onboard reasoner 304, is further configured to determine a measure of fix effectivity (at block 714) of all the service actions performed across all fleet vehicles to address the failure mode (e.g. determine fix effectivity of the service action performed on the specific vehicle and related service actions performed on other vehicles in the same fleet). A determination of a low fix effectivity is made where the service action did not resolve the fault (such as a service action of only antiskid wheel-speed transducer repair), while a determination of a high fix effectivity is made where the service action resolves the fault (such as a related service action including antiskid wheel-speed transducer repair and servicing the brake controller 506).

By utilizing identical diagnostic reasoners and the greater extent of data across a number of vehicles in the fleet, the off-board copy 312 of the onboard reasoner 304, is further configured to diagnose the failure mode or an alternated failure mode onboard the vehicle(s), and determine a maintenance recommendation of a maintenance action to address such a failure mode, where the maintenance recommendation of a maintenance action is determined based on the feedback of the fix effectivity and represents a more effective solution for application across all vehicles within the fleet, as shown at blocks 716 and 718. The off-board copy 312 of the onboard reasoner 304 is configured to generate a message of the maintenance recommendation, which may be provided to one or more vehicles in the fleet to hereby enable improvement to diagnostics for all vehicles in the fleet, for a fleet-wide improvement (e.g. operation of the vehicles across the fleet, the fault diagnostic models, etc.), as shown at block 720.

Figure 8:
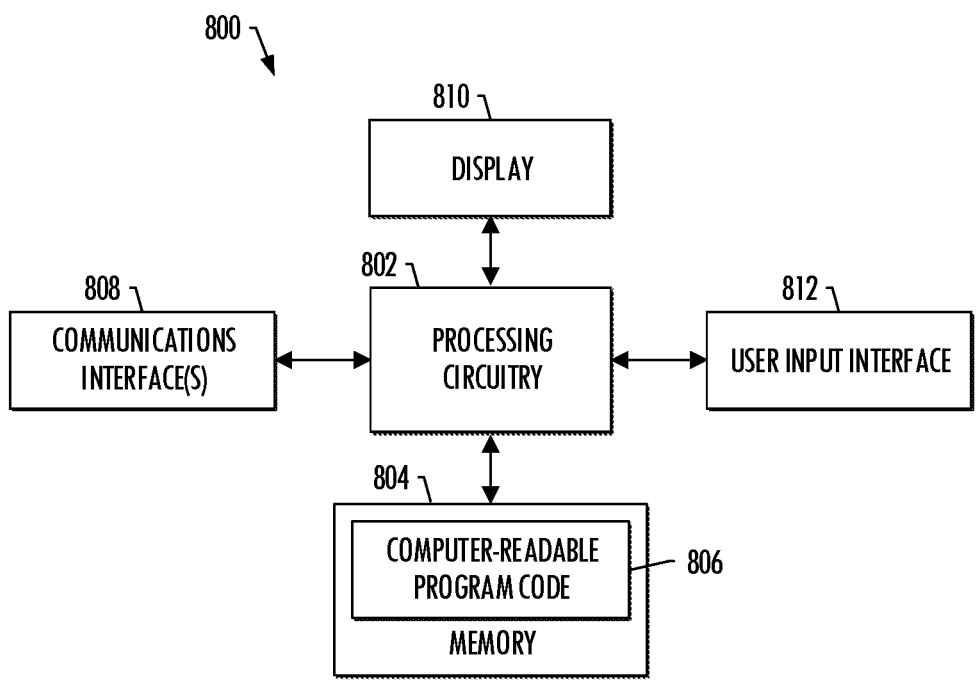
FIG. 8 illustrates an apparatus according to some example implementations.

FIG. 8 illustrates an apparatus 800 according to some example implementations of the present disclosure. Generally, an apparatus of exemplary implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, processing circuitry 802 (e.g., processor unit) connected to a memory 804 (e.g., storage device).

The processing circuitry 802 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 804 (of the same or another apparatus).

The processing circuitry 802 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 804 is generally any piece of computer hardware that is capable of storing information such as, for example, data, computer programs (e.g., computer-readable program code 806) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk—read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 804, the processing circuitry 802 may also be connected to one or more interfaces for displaying, transmitting and/or receiving information. The interfaces may include a communications interface 808 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 810 and/or one or more user input interfaces 812 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 800 may include a processing circuitry 802 and a computer-readable storage medium or memory 804 coupled to the processing circuitry, where the processing circuitry is configured to execute computer-readable program code 806 stored in the memory. It will also be understood that one or more functions, and combinations of functions, may be implemented by special purpose hardware-based computer systems and/or processing circuitry which perform the specified functions, or combinations of special purpose hardware and program code instructions.

As explained above and reiterated below, the present disclosure includes, without limitation, the following example implementations.

Clause 1. A system for use in maintenance of a vehicle that includes vehicle systems configured to report faults to an onboard reasoner, the system comprising: an onboard computer including the onboard reasoner that is configured to receive a fault report indicating failed tests reported by a vehicle system, diagnose a failure mode onboard the vehicle, from the failed tests, and using an onboard diagnostic model that represents or describes known relationships between possible failed tests reported by the vehicle systems, and possible failure modes onboard the vehicle systems, the onboard reasoner further configured to determine a service recommendation of a service action to address the failure mode; and an off-board computer including an off-board copy of the onboard reasoner configured to receive the fault report indicating the failed tests, and further address the fault report based on a measure of fix effectivity of the service action, including the off-board copy of the onboard reasoner configured to at least: receive the measure of fix effectivity of the service action as performed to address the failure mode; diagnose the failure mode or an alternate failure mode onboard the vehicle, from the failed tests and the measure of fix effectivity of the service action, and using an off-board copy of the onboard diagnostic model; and responsive to diagnosis of the alternate failure mode, determine a maintenance recommendation of a maintenance action to address the alternate failure mode; and generate a maintenance message including the maintenance recommendation.

Clause 2. The system of clause 1, wherein the off-board computer is further configured to at least: record performance of the service action on the vehicle; and determine the measure of fix effectivity of the service action as performed to address the failure mode.

Clause 3. The system of clause Clause 1 or clause 2, wherein the off-board copy of the onboard reasoner is configured to receive fault reports across a fleet of vehicles of an operator, the fleet of vehicles with respective onboard computers including the onboard reasoner that uses the onboard diagnostic model, the off-board copy of the onboard reasoner configured to further address the fault reports based on measures of fix effectivity of respective service actions as performed across the fleet of vehicles.

Clause 4. The system of any of clauses 1 to 3, wherein the system further comprises a second off-board computer including a fault modeling tool configured to receive the fault report indicating the failed tests, and further address the fault report based on at least one of the measure of fix effectivity of the service action, or a measure of fix effectivity of the maintenance action, including the fault modeling tool configured to at least: receive one or more measures of fix effectivity including the at least one of the measure of fix effectivity of the service action, or the measure of fix effectivity of the maintenance action as performed to address the alternate failure mode; update a second off-board copy of the onboard diagnostic model based on the fault report, and the one or more measures of fix effectivity; and update the onboard diagnostic model used by the onboard reasoner on the onboard computer to incorporate the update to the second off-board copy of the onboard diagnostic model.

Clause 5. The system of clause 4, wherein the second off-board computer is further configured to at least: record performance of the maintenance action on the vehicle; and determine the measure of fix effectivity of the maintenance action as performed to address the alternate failure mode.

Clause 6. The system of clause 4 or clause 5, wherein the fault modeling tool is configured to receive fault reports across a fleet of vehicles of an operator, the fleet of vehicles with respective onboard computers including the onboard reasoner that uses the onboard diagnostic model, the fault modeling tool configured to further address the fault reports based on at least one of measures of fix effectivity of respective service actions, or measures of fix effectivity of respective maintenance actions, as performed across the fleet of vehicles.

Clause 7. The system of clause 6, wherein the fault modeling tool is configured to receive fault reports across a plurality of fleets of vehicles of a plurality of operators, the fault modeling tool configured to further address the fault reports based on the at least one of measures of fix effectivity of respective service actions, or measures of fix effectivity of respective maintenance actions, as performed across the plurality of fleets of vehicles.

Clause 8. A method for use in maintenance of a vehicle that includes vehicle systems configured to report faults to an onboard reasoner, the method comprising: an onboard computer including the onboard reasoner receiving a fault report indicating failed tests reported by a vehicle system, diagnosing a failure mode onboard the vehicle, from the failed tests, and using an onboard diagnostic model that represents or describes known relationships between possible failed tests reported by the vehicle systems, and possible failure modes onboard the vehicle systems, the onboard reasoner further determining a service recommendation of a service action to address the failure mode; and an off-board computer including an off-board copy of the onboard reasoner receiving the fault report indicating the failed tests, and further addressing the fault report based on a measure of fix effectivity of the service action, including the off-board copy of the onboard reasoner at least: receiving the measure of fix effectivity of the service action as performed to address the failure mode; diagnosing the failure mode or an alternate failure mode onboard the vehicle, from the failed tests and the measure of fix effectivity of the service action, and using an off-board copy of the onboard diagnostic model; and responsive to diagnosis of the alternate failure mode, determining a maintenance recommendation of a maintenance action to address the alternate failure mode; and generating a maintenance message including the maintenance recommendation.

Clause 9. The method of clause 8, wherein the method further comprises the off-board computer further at least: recording performance of the service action on the vehicle; and determining the measure of fix effectivity of the service action as performed to address the failure mode.

Clause 10. The method of clause 8 or clause 9, wherein the off-board copy of the onboard reasoner receives fault reports across a fleet of vehicles of an operator, the fleet of vehicles with respective onboard computers including the onboard reasoner that uses the onboard diagnostic model, the off-board copy of the onboard reasoner further addressing the fault reports based on measures of fix effectivity of respective service actions as performed across the fleet of vehicles.

Clause 11. The method of any of clauses 8 to 10, wherein the method further comprises a second off-board computer including a fault modeling tool receiving the fault report indicating the failed tests, and further addressing the fault report based on at least one of the measure of fix effectivity of the service action, or a measure of fix effectivity of the maintenance action, including the fault modeling tool at least: receiving one or more measures of fix effectivity including the at least one of the measure of fix effectivity of the service action, or the measure of fix effectivity of the maintenance action as performed to address the alternate failure mode; updating a second off-board copy of the onboard diagnostic model based on the fault report, and the one or more measures of fix effectivity; and updating the onboard diagnostic model used by the onboard reasoner on the onboard computer to incorporate the update to the second off-board copy of the onboard diagnostic model.

Clause 12. The method of clause 11, wherein the method further comprises the second off-board computer further at least: recording performance of the maintenance action on the vehicle; and determining the measure of fix effectivity of the maintenance action as performed to address the alternate failure mode.

Clause 13. The method of clause 11 or clause 12, wherein the fault modeling tool receives fault reports across a fleet of vehicles of an operator, the fleet of vehicles with respective onboard computers including the onboard reasoner that uses the onboard diagnostic model, the fault modeling tool further addressing the fault reports based on at least one of measures of fix effectivity of respective service actions, or measures of fix effectivity of respective maintenance actions, as performed across the fleet of vehicles.

Clause 14. The method of clause 13, wherein the fault modeling tool receives fault reports across a plurality of fleets of vehicles of a plurality of operators, the fault modeling tool further addressing the fault reports based on the at least one of measures of fix effectivity of respective service actions, or measures of fix effectivity of respective maintenance actions, as performed across the plurality of fleets of vehicles.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system for use in maintenance of a vehicle that includes vehicle systems configured to report faults to an onboard reasoner, the system comprising:

an onboard computer including the onboard reasoner that is configured to receive a fault report indicating failed tests reported by a vehicle system, diagnose a failure mode onboard the vehicle, from the failed tests, and using an onboard diagnostic model that represents or describes known relationships between possible failed tests reported by the vehicle systems, and possible failure modes onboard the vehicle systems, the onboard reasoner further configured to determine a service recommendation of a service action to address the failure mode; and an off-board computer including an off-board copy of the onboard reasoner configured to receive the fault report indicating the failed tests, and further address the fault report based on a measure of fix effectivity of the service action, including the off-board copy of the onboard reasoner configured to at least:

receive the measure of fix effectivity of the service action as performed to address the failure mode;

diagnose the failure mode or an alternate failure mode onboard the vehicle, from the failed tests and the measure of fix effectivity of the service action, and using an off-board copy of the onboard diagnostic model; and responsive to diagnosis of the alternate failure mode, determine a maintenance recommendation of a maintenance action to address the alternate failure mode; and generate a maintenance message including the maintenance recommendation.

2. The system of claim 1, wherein the off-board computer is further configured to at least:

record performance of the service action on the vehicle; and determine the measure of fix effectivity of the service action as performed to address the failure mode.

3. The system of claim 1, wherein the off-board copy of the onboard reasoner is configured to receive fault reports across a fleet of vehicles of an operator, the fleet of vehicles with respective onboard computers including the onboard reasoner that uses the onboard diagnostic model, the off-board copy of the onboard reasoner configured to further address the fault reports based on measures of fix effectivity of respective service actions as performed across the fleet of vehicles.

4. The system of claim 1, wherein the system further comprises a second off-board computer including a fault modeling tool configured to receive the fault report indicating the failed tests, and further address the fault report based on at least one of the measure of fix effectivity of the service action, or a measure of fix effectivity of the maintenance action, including the fault modeling tool configured to at least:

receive one or more measures of fix effectivity including the at least one of the measure of fix effectivity of the service action, or the measure of fix effectivity of the maintenance action as performed to address the alternate failure mode;

update a second off-board copy of the onboard diagnostic model based on the fault report, and the one or more measures of fix effectivity; and update the onboard diagnostic model used by the onboard reasoner on the onboard computer to incorporate the update to the second off-board copy of the onboard diagnostic model.

5. The system of claim 4, wherein the second off-board computer is further configured to at least:

record performance of the maintenance action on the vehicle; and determine the measure of fix effectivity of the maintenance action as performed to address the alternate failure mode.

6. The system of claim 4, wherein the fault modeling tool is configured to receive fault reports across a fleet of vehicles of an operator, the fleet of vehicles with respective onboard computers including the onboard reasoner that uses the onboard diagnostic model, the fault modeling tool configured to further address the fault reports based on at least one of measures of fix effectivity of respective service actions, or measures of fix effectivity of respective maintenance actions, as performed across the fleet of vehicles.

7. The system of claim 6, wherein the fault modeling tool is configured to receive fault reports across a plurality of fleets of vehicles of a plurality of operators, the fault modeling tool configured to further address the fault reports based on the at least one of measures of fix effectivity of respective service actions, or measures of fix effectivity of respective maintenance actions, as performed across the plurality of fleets of vehicles.

8. A method for use in maintenance of a vehicle that includes vehicle systems configured to report faults to an onboard reasoner, the method comprising:

an onboard computer including the onboard reasoner receiving a fault report indicating failed tests reported by a vehicle system, diagnosing a failure mode onboard the vehicle, from the failed tests, and using an onboard diagnostic model that represents or describes known relationships between possible failed tests reported by the vehicle systems, and possible failure modes onboard the vehicle systems, the onboard reasoner further determining a service recommendation of a service action to address the failure mode; and an off-board computer including an off-board copy of the onboard reasoner receiving the fault report indicating the failed tests, and further addressing the fault report based on a measure of fix effectivity of the service action, including the off-board copy of the onboard reasoner at least:

receiving the measure of fix effectivity of the service action as performed to address the failure mode;

diagnosing the failure mode or an alternate failure mode onboard the vehicle, from the failed tests and the measure of fix effectivity of the service action, and using an off-board copy of the onboard diagnostic model; and responsive to diagnosis of the alternate failure mode, determining a maintenance recommendation of a maintenance action to address the alternate failure mode; and generating a maintenance message including the maintenance recommendation.

9. The method of claim 8, wherein the method further comprises the off-board computer further at least:

recording performance of the service action on the vehicle; and determining the measure of fix effectivity of the service action as performed to address the failure mode.

10. The method of claim 8, wherein the off-board copy of the onboard reasoner receives fault reports across a fleet of vehicles of an operator, the fleet of vehicles with respective onboard computers including the onboard reasoner that uses the onboard diagnostic model, the off-board copy of the onboard reasoner further addressing the fault reports based on measures of fix effectivity of respective service actions as performed across the fleet of vehicles.

11. The method of claim 8, wherein the method further comprises a second off-board computer including a fault modeling tool receiving the fault report indicating the failed tests, and further addressing the fault report based on at least one of the measure of fix effectivity of the service action, or a measure of fix effectivity of the maintenance action, including the fault modeling tool at least:
  receiving one or more measures of fix effectivity including the at least one of the measure of fix effectivity of the service action, or the measure of fix effectivity of the maintenance action as performed to address the alternate failure mode;
  updating a second off-board copy of the onboard diagnostic model based on the fault report, and the one or more measures of fix effectivity; and
  updating the onboard diagnostic model used by the onboard reasoner on the onboard computer to incorporate the update to the second off-board copy of the onboard diagnostic model.

12. The method of claim 11, wherein the method further comprises the second off-board computer further at least:
  recording performance of the maintenance action on the vehicle; and
  determining the measure of fix effectivity of the maintenance action as performed to address the alternate failure mode.

13. The method of claim 11, wherein the fault modeling tool receives fault reports across a fleet of vehicles of an operator, the fleet of vehicles with respective onboard computers including the onboard reasoner that uses the onboard diagnostic model, the fault modeling tool further addressing the fault reports based on at least one of measures of fix effectivity of respective service actions, or measures of fix effectivity of respective maintenance actions, as performed across the fleet of vehicles.

14. The method of claim 13, wherein the fault modeling tool receives fault reports across a plurality of fleets of vehicles of a plurality of operators, the fault modeling tool further addressing the fault reports based on the at least one of measures of fix effectivity of respective service actions, or measures of fix effectivity of respective maintenance actions, as performed across the plurality of fleets of vehicles.

15. The system of claim 1, wherein the onboard diagnostic model includes nodes connected by edges, including a node representing each of failed tests and a node representing the failure mode with a known causal relationship to the failed tests as indicated by the edges connecting the nodes, and the onboard diagnostic model diagnoses the failure mode from the failed test and generates a service message that references instructions for performing a service action.

16. The system of claim 1, wherein the off-board computer including the off-board copy of the onboard reasoner, is configured to receive the fault report indicating the failed tests from the vehicle and record a performance of the service action on the vehicle, and is further configured to record performance of related service actions on other vehicles that encountered the same fault report where such related service actions on other vehicles included performance of additional services.

17. The system of claim 1, wherein the off-board computer including the off-board copy of the onboard reasoner, is further configured to determine a measure of fix effectivity of the service action performed on the vehicle and related service actions performed on other vehicles across a fleet of vehicles of an operator to address the failure mode, wherein a determination of a low fix effectivity is made where the service action did not resolve the failure mode and additional troubleshooting, additional replaced parts, or additional secondary maintenance actions are required.

18. The system of claim 1, wherein the off-board copy of the onboard reasoner is further configured to use data across a number of vehicles in a fleet to diagnose the failure mode or an alternated failure mode, and determine a maintenance recommendation of an alternate maintenance action to address the failure mode, where the maintenance recommendation of the alternate maintenance action is determined based on feedback of the measure of fix effectivity.

19. The system of claim 4, wherein the fault modeling tool is configured to update the second off-board copy of the onboard diagnostic model based on the fault report and the one or more measures of fix effectivity for the service action performed on the vehicle and related service actions performed across a fleet of vehicles of an operator, and the fault modeling tool is configured to update the onboard diagnostic model used by the onboard reasoner on the onboard computer to incorporate the update to the second off-board copy of the onboard diagnostic model.

20. The method of claim 8, wherein the onboard diagnostic model includes nodes connected by edges, including a node representing each of failed tests and a node representing the failure mode with a known causal relationship to the failed tests as indicated by the edges connecting the nodes, and the onboard diagnostic model diagnoses the failure mode from the failed test and generates a service message that references instructions for performing a service action.

* * * * *